(No Model.) 2 Sheets—Sheet 1.
H. F. SMITH.
APPARATUS FOR MOLDING ARTICLES FROM PULP.
No. 415,304. Patented Nov. 19, 1889.
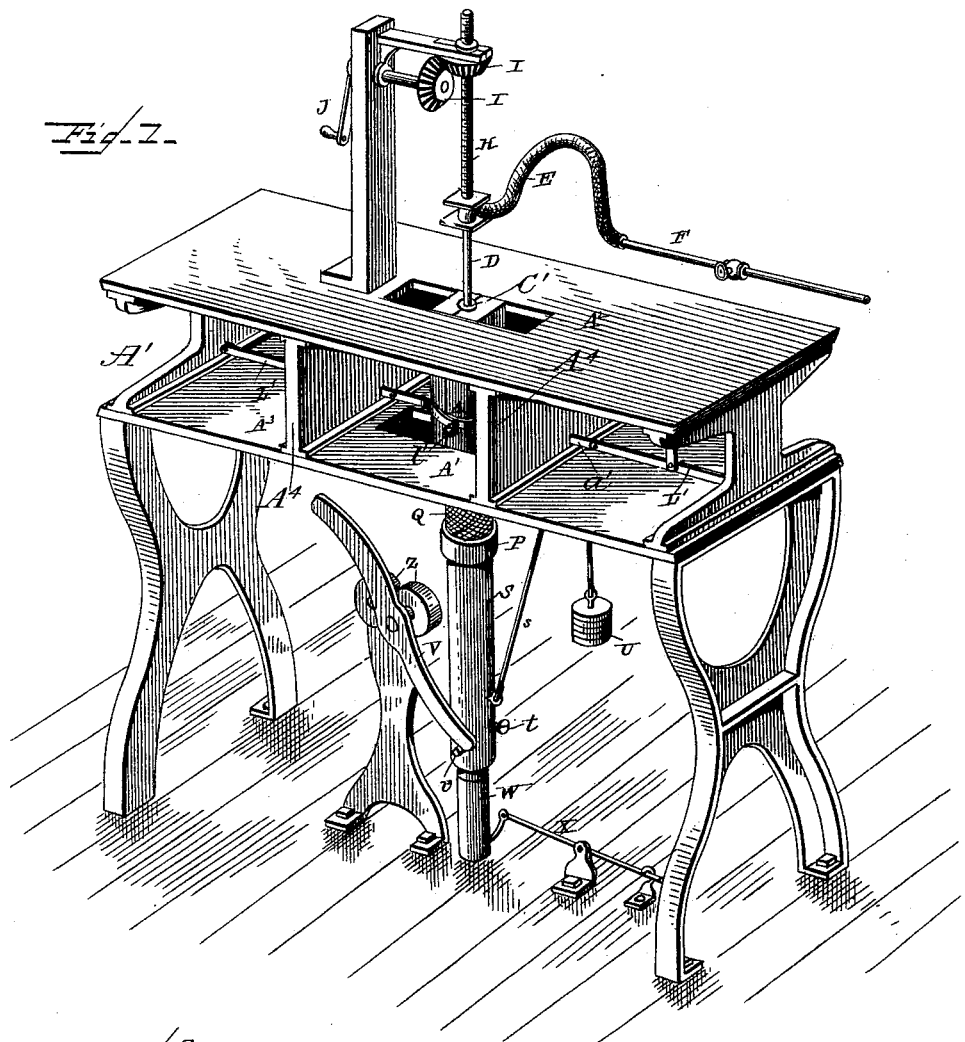
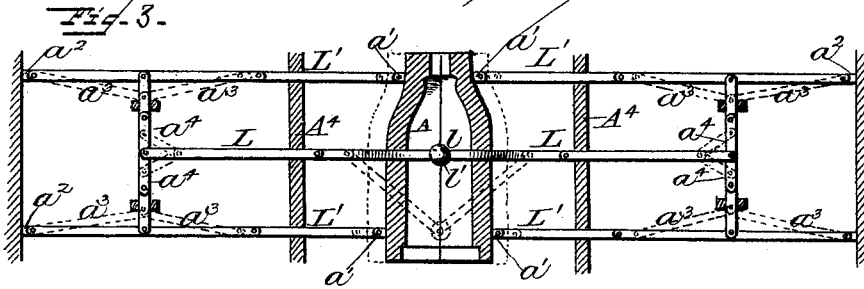
WITNESSES
Edwin T. Yewell.
Samuel Pursell.
INVENTOR
Howard F. Smith
By F. L. Browne
Attorney

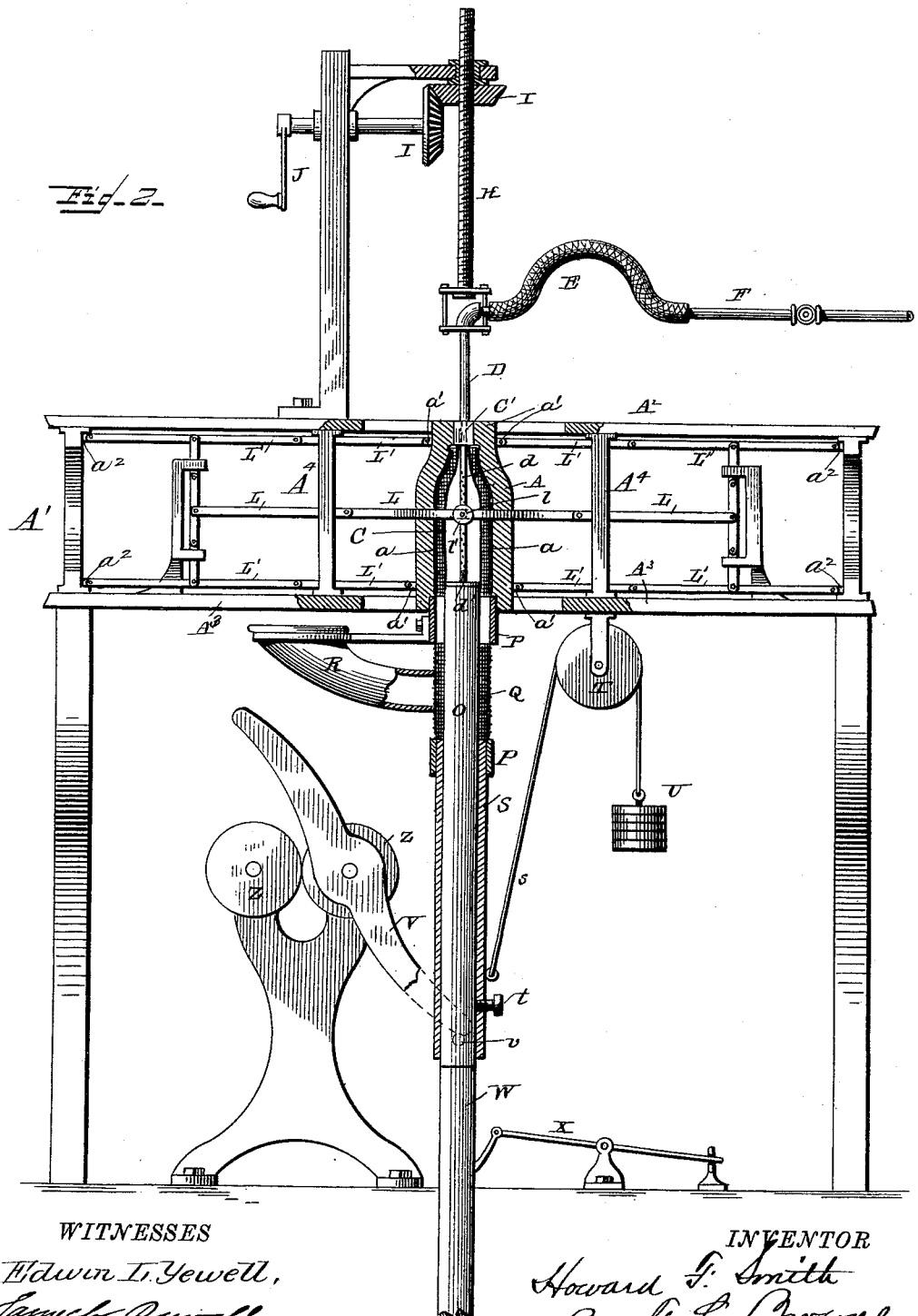

ered to a pump, reservoir,
UNITED STATES PATENT OFFICE.

HOWARD FOSTER SMITH, OF ELKHART, INDIANA.

APPARATUS FOR MOLDING ARTICLES FROM PULP.

SPECIFICATION forming part of Letters Patent No. 415,304, dated November 19, 1889.

Application filed June 25, 1888. Serial No. 278,074. (No model.)

*To all whom it may concern:*

Be it known that I, HOWARD FOSTER SMITH, a citizen of the United States, residing at Elkhart, in the county of Elkhart and State of Indiana, have invented certain new and useful Improvements in Apparatus for Molding Articles from Pulp; and I do hereby declare the following to be a full, clear, and exact description of the invention, such as will enable others skilled in the art to which it appertains to make and use the same.

This invention relates to molds for forming bottles, flasks, and other hollow articles from wood or paper pulp. In principle it is the same as an apparatus described by me in an application for Letters Patent filed June 27, 1887, Serial No. 241,606, in which was shown a sectional mold having an interior chamber of the shape of the article to be produced and containing an expansible former, which when distended crowded the pulp between itself and the wall of the mold, and thus gave the shape of the article.

The object of the present invention is to improve the quality of the molded articles by assuring their absolute uniformity in thickness, and this is done by a novel means of centering the expansible former and holding it immovable at top and bottom while being expanded, so that its distention relatively to the mold-walls is equal and uniform throughout its extent.

The invention consists, partly, in this feature, and also in novel mechanism for opening and closing the mold-sections and peculiar means for forcing the pulp into the mold previous to the formation of the article by the expansion of the flexible former. All these features will be fully hereinafter described and then claimed, and they will be best understood by reference to the accompanying drawings, in which—

Figure 1 is a perspective view of the entire apparatus. Fig. 2 is an elevation and partial section; Fig. 3, a diagram showing the operation of the levers for separating the mold-sections.

A represents a sectional or two-part mold, which is shown as mounted upon a bench or table A', the latter acting as a support for the entire mechanism. The mold when closed has the interior conformation to produce the desired article from pulp, in the present case the latter being a bottle of ordinary shape. The mold-sections are lined with one or more layers $a$ of wire-cloth, Fig. 2, and in addition may be fluted on the inside to permit the water to escape more readily.

C represents the collapsible and expansible former, made preferably of soft rubber and hollow to admit the air or other expanding agent. It is made in the exact shape of the article to be molded and of such size that when expanded to the full extent it will leave the proper space between itself and the mold to produce the right thickness of the bottle or other article.

The mouth of the mold is closed by a plug C', which abuts against the end of the former C. Into this plug passes the air-pipe D, which is continued by a smaller pipe $d$, extending through the neck of the former, its lower end fitting over a stud $d'$ in the base of said former. The former is thus centered in the mold by being clamped at the top around pipe $d$, which is held rigidly in position by the plug C', and hence does not permit the base of the former to move out of line. The pipe $d$ is perforated at various points to permit the compressed air or water under pressure to enter the flexible former and expand it.

Compressed air or hydraulic pressure may be used for expanding the former. In either case the air or water is supplied to the pipe B by a hose E, connected to a supply-pipe F, the latter being connected to a pump, reservoir, or other source of supply.

I have devised certain novel mechanism for feeding the pulp and for forcing it into the mold and compacting it therein by vertical pressure previous to the expansion of the flexible former. The pulp is contained in a box or reservoir, (not shown,) from which it descends by a pipe or funnel R by gravity and pressure to a position below the mold, into which it is forced by the vertical pressure of a piston or plunger in a manner now to be explained. Before the pulp is forced into the mold, sufficient air is let into the flexible former to hold it firmly in shape without expanding it, so that the pulp forced in does not cause it to collapse.

The bottom of the flexible former is normally supported by a solid rod O, which rests upon a movable support W. This rod is surrounded by a pipe P, having a wire-cloth or perforated metal section Q, a space being left between rod O and pipe P for the passage of the plunger S, which is a hollow vertically-sliding tube fitting closely in said space. The plunger is connected by a cord $s$, passing over a pulley T to a weight U, which raises it at the proper time. The pulp is fed by the funnel into the wire-cloth pipe Q above the plunger, which when raised forces a portion of the pulp into the mold outside of the collapsible former, the pressure straining the greater portion of the water out through the wire-cloth Q. As the plunger rises it cuts off the supply of pulp by closing the end of the funnel. The plunger S is retracted to its former position by means of a revolving cam V, mounted on a suitable shaft and operated by friction or other gear Z Z and any suitable power. This cam strikes a stud $v$ on plunger S, and, overcoming the resistance of weight U, forces said plunger down to its former position. Both arms of the cam V are adapted to operate in this way alternately with the weight, so that the pulp in successive charges is forced into the mold, gradually filling the space around the former. At each charge the stroke of the plunger grows shorter until the sides of the mold have been filled and sufficient pulp supplied to form the whole bottle except the bottom. The water pressed out of the pulp escapes through the wire-cloth lining of the mold or descends with the plunger. The bottom of the bottle is formed by means of the rod O. The plunger S being held by the weight to the top of its stroke, the walls being fully formed, it is even with the top of the rod O. The rod O and plunger S are then secured together by some such means as a set-screw $t$, so that they become temporarily a single movable plunger operated in the same manner as the plunger S separately. The support W, being lowered by means of lever X, permits the descent of rod O with plunger S.

The pulp is admitted above the plunger O S and forced up to the mold in sufficient quantity to form the bottom of the bottle. The friction-wheels Z Z are then separated in any well-known manner, stopping the motion of the cam, so that the weight U can hold the plunger up at the highest point, where it forms the bottom of the mold. The compressed air or other agent is then let into the former, which is expanded and completes the bottle by pressure against the sides and bottom of the mold.

When the former is allowed to collapse, (by means of a petcock in pipe F or other means by which the air may escape,) it is drawn out of the vessel just completed by means of a screw H and gears I I, operated by a crank J, the vertical movement being permitted by the flexible hose E.

The bottle or other article is removed from the mold by separating the mold-sections by a system of levers shown in all the figures, but particularly in diagram Fig. 3. Each of the mold-sections has two guides or projections $a'\ a'$ at top and bottom, which fit within slots in the upper and lower parts $A^2\ A^3$ of the table $A'$.

Between the upper and lower parts $A^2\ A^3$ of the table $A'$ are arranged a series of six toggle-joint levers L L' L', as shown more particularly in Fig. 3 of the drawings. The extremities of the upper and lower toggle-levers are fulcrumed, respectively, to the projections $a'\ a'$ on the mold-sections and to similar projections $a^2\ a^2$ at each side of the table of the apparatus. The portions of the said toggle-levers L' L' connected to the mold-sections slide horizontally in slots in the partitions $A^4$ of the table, and the links $a^3$ of said levers are connected by means of links $a^4$ with the toggle-levers L, the outer arms of which slide in slots in the partitions $A^4$, and the inner arms of which are pivoted together at $l$ and provided with a handle $l'$, by means of which the whole system of levers may be operated. To close the mold-sections, the connecting-arms of the toggle-levers are brought in line with their horizontally-movable arms, as shown in solid lines in Fig. 3 of the drawings. To open or separate the mold-sections, the said connected arms of the levers L are thrown down, as shown in Fig. 3, causing the whole system of levers to assume the positions shown partly in dotted lines in the said Fig. 3 of the drawings.

It is not necessary in the present case to describe or consider the operation of any devices for producing the air or other pressure. Any suitable means—such as those described in my former application above referred to—may be used.

What I claim is—

1. In a mold for producing hollow articles from pulp, the combination of the expansible former, the pipe carrying the same, the plug on said pipe, and the plunger mounted thereon, whereby the expansible former is centered within the mold, substantially as specified.

2. The combination, with a mold, for the purpose set forth, and with the hollow expansible former contained therein, of a pipe entering and supporting said former at one end and connected to it at the other end, substantially as described.

3. The combination, with a mold having an interior expansible former, of a pipe or bushing entering one end of said mold, so as to abut against the end of said former, and a pipe passing through the bushing and former to supply air to the interior of said former, substantially as described.

4. The combination, with the mold, of the expansible former, the perforated air-pipe entering the same, the centering-plug on said pipe, adapted to enter one end of the mold and abut against the end of the former, and the centering-stud over which the inner end of said pipe fits, substantially as specified.

5. In a mold for the purpose described, the combination, with the hollow expansible former, of the air-pipe fitting closely within the neck of said former, and the small pipe $d$, connected to its lower end and having perforations, substantially as described.

6. In an apparatus for making articles from pulp, the combination, with the two-part mold, of the collapsible former and a hollow plunger operating in conjunction therewith, substantially as and for the purposes specified.

7. The combination, with the open-bottomed mold having the flexible former, of a solid rod for supporting the said former and closing the bottom of the mold, and a sliding piston or plunger surrounding said rod, substantially as set forth.

8. The combination, with a pulp-mold, of a funnel or tube for supplying the pulp and a sliding piston or plunger for feeding the pulp to the mold, said piston acting as a cut-off to the supply of pulp from said funnel, substantially as described.

9. The combination, with a pulp-mold, of a reciprocating piston for forcing the pulp into the mold at successive strokes and a funnel for supplying pulp automatically above the piston after each downstroke of the latter, the said piston acting as a cut-off to the supply of pulp during each upstroke, substantially as described.

10. The combination, with the pulp-mold, of the rod O, the pipe P, having the perforated section Q, the funnel R, and the piston S, sliding within said pipe P, substantially as described.

11. In an apparatus for molding articles from pulp, the combination, with an open-bottomed mold and collapsible former, of a hollow piston for supplying pulp to form the walls of the article and a solid piston for supplying pulp to form its bottom, substantially as described.

12. The combination, with the mold and collapsible former, of a hollow piston, as S, for supplying pulp in successive charges from which the sides or walls of the molded article are formed, a solid piston adapted to be connected to said hollow piston for supplying the pulp from which the bottom is formed, and mechanism, substantially as described, for causing said pistons to reciprocate, substantially as described.

13. The combination, with the sliding piston and the pulp-feeding devices, of a weight connected to said piston for forcing it constantly upward and a revolving cam for overcoming said weight at proper times, thus lowering the piston, substantially as described.

14. The combination, with the mold having the collapsible former and air-supply pipe, of an elevating-screw connected to said air-pipe and the beveled gearing for raising the collapsed former through the molded article, substantially as described.

15. The combination, with the mold-sections, of the toggle-levers connected with the upper and lower parts of said sections and the intermediate toggle-levers connected with the first-mentioned levers, the whole arranged to operate substantially in the manner and for the purposes specified.

In testimony whereof I affix my signature in presence of two witnesses.

HOWARD FOSTER SMITH.

Witnesses:
WILLIAM FLEMING,
NORM BARBER.